Aug. 5, 1969  F. PAPKE ET AL  3,459,110
PHOTOGRAPHIC CAMERA WITH ONLY ONE CARTRIDGE CHAMBER
Filed June 9, 1967  5 Sheets-Sheet 1

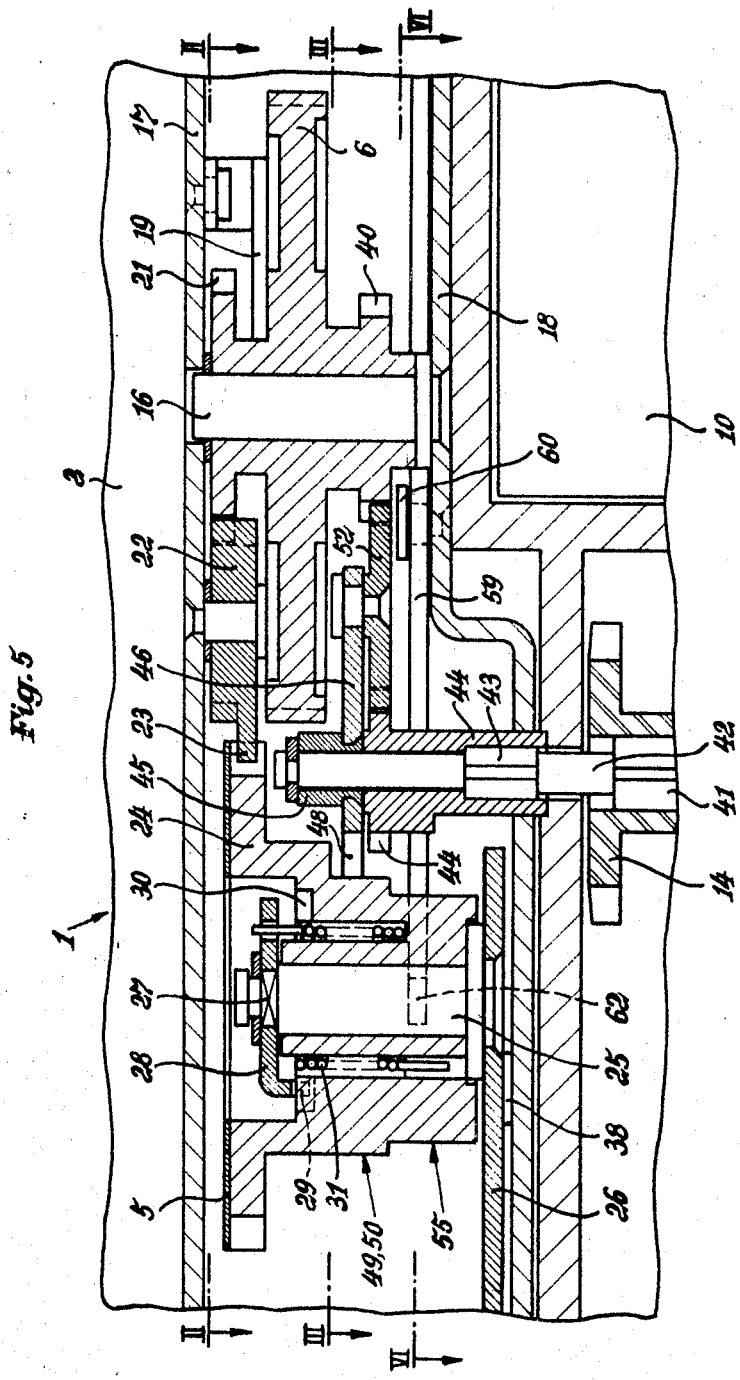

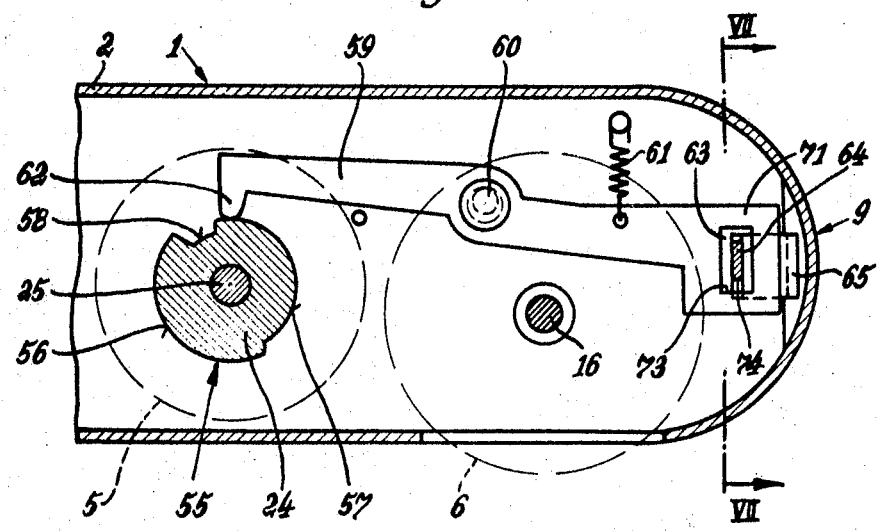
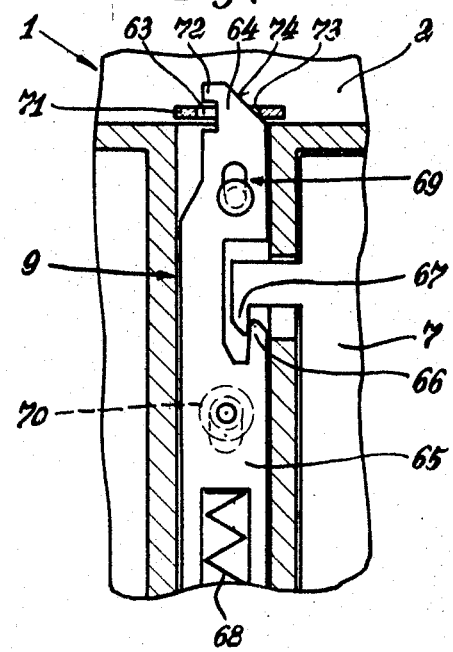

3,459,110
PHOTOGRAPHIC CAMERA WITH ONLY ONE
CARTRIDGE CHAMBER
Friedrich Papke and Horst Golombek, Braunschweig,
Germany, assignors to Voigtlander, A.G., Braunschweig, Germany
Filed June 9, 1967, Ser. No. 644,992
Claims priority, application Germany, June 18, 1966,
V 31,297
Int. Cl. G03b 19/04
U.S. Cl. 95—31                    15 Claims

ABSTRACT OF THE DISCLOSURE

A photographic camera wherein the camera housing is provided with only one cartridge chamber to receive a cartridge of film which is to be exposed. This film is preferably coiled within the cartridge without being supported by a rotary spool. The camera housing has, spaced from the only cartridge chamber thereof, a film-receiving chamber to receive exposed film, and the film is rewound back into the cartridge from the film-receiving chamber. For this purpose a film-moving rotary sprocket is situated in the camera housing between the above chambers thereof for advancing the film from the cartridge chamber to the film-receiving chamber after each frame is exposed and for then rewinding the film back into the cartridge. A manually operable rotary means is accessible to the operator for actuating the camera, and a transmission means coacts with this manually operable rotary means and the film-moving sprocket to drive the latter in response to rotation of the manually operable rotary means. This latter means is limited to only one direction of rotation, and the transmission means has an advance position to drive the sprocket in a direction which will advance film from the cartridge to the film-receiving chamber and a rewinding position to return the film from the film-receiving chamber back into the cartridge. A cam means which is driven by the manually operable rotary means coacts with the transmission means to hold the latter in its advance position during turning of this cam means through a first angular increment and to hold the transmission means in its rewinding position during a second angular increment of turning of the cam means. A counter structure is connected with the cam means to turn therewith so as to indicate to the operator the number of film frames which are exposed during the first angular increment of turning of the cam means and so as to indicate that film rewinding operations are taking place during the second angular increment of turning of the cam means. The housing of the camera is provided with a closure capable of opening and closing the camera housing and a releasable lock structure coacts with the closure to releasably maintain the latter in its closed position. A second rotary cam means is driven from the manually operable rotary means and forms a coaxial unit with the first cam means, and this second cam means coacts with the releasable lock means to prevent displacement thereof to its release position during rewinding of film while automatically placing the lock means in its release position at the end of the rewinding operations.

Background of the invention

The present invention relates to cameras.

More particularly, the present invention relates to still cameras of the type which are adapted to receive unexposed film supplied in cartridges wherein the film is coiled without being supported by a spool.

Thus, there are known photographic cameras where the film which is to be exposed is unwound from a spool situated in a suitable cassette, exposed, and then wound onto a take-up spool of the camera. After the exposures are made, the film is rewound back into the cassette on the spool therein. In certain known cameras the manipulations involved in connection with advancing the film during exposure thereof and rewinding the film after exposure thereof are carried out by the same operating members which may take the form of a rotary knob which turns in only one direction or which may take the form of a swing-lever which is swung back and forth.

Such operating members are operatively connnected with the take-up spool of the camera during advancing of the film when frames thereof are exposed. At the end of the exposure of the film, this operative connection between the manually operable members and the take-up spool is interrupted by actuation of special adjusting components, and then the manually operable components are operatively connected with the spool which is in the cassette so that during the subsequent actuation of the manually operable members the film is wound back onto the spool in the cassette and unwound from the take-up spool of the camera.

With constructions of this type there is, indeed, the advantage of requiring only a single manually operable member both for the advancing of the film and for the rewinding thereof, so that only this one member need be actuated by the operator, but nevertheless the operator is compelled to bring about both the advancing of the film and the rewinding thereof after an adjustment is made with a special adjusting member, so that if this latter adjusting member is inadvertently placed in the wrong position, there will be a faulty handling of the film. Moreover, with constructions of this type it is required that when the film is initially placed in the camera, the leading end of the film must be manually connected with the take-up spool of the camera.

There are also known cameras where the film is unwound from a spool which is situated in a cassette, and after the film is exposed it is advanced into a film-receiving chamber of the camera housing in which the film is wound into a coil without being supported on any spool. Thereafter, the film is rewound back onto the spool in the cassette. The film is advanced with this type of construction by a suitable film-advancing claw which is actuated by a lever supported by the rear wall of the camera, and the rewinding of the film takes place with rotary movement of the spool being brought about by a spring which is set into operation by actuation of a suitable control slide. The film-advancing structure of a camera of this type is operatively connected by a suitable blocking component with the structure which locks the swingable rear wall of the camera so that the rear wall can only be opened either when the film has not yet been displaced out of the cassette or when it has already been rewound back into the cassette.

The present invention relates to photographic cameras of still another type, namely those photographic cameras wherein the perforated film is supplied in a cartridge in which the film is coiled without being supported on a spool.

It is known to construct cameras of this type in such a way that the unexposed film is advanced out of the spool-less cartridge, is exposed, and is then fed into an identical spool-less cartridge which is subsequently removed from the camera together with the exposed film which is contained therein. With this type of camera the operator must then remove the empty cartridge which was initially placed in the camera with the unexposed film, and this now empty cartridge must be placed at the location of the cartridge which has been removed with the exposed film, so that the cartridge which was initially placed in the camera with the unexposed film is transferred to a position to receive the next strip of film which is exposed. Then a new cartridge with unexposed film is placed in the camera in the cartridge chamber thereof which is provided for receiving a new cartridge with unexposed film.

Thus, with cameras of this type there is in fact no rewinding of the exposed film, but nevertheless it is possible for errors to be made in connection with the introduction and removal of the cartridges, and it can happen that when, due to inadvertence, there is in the camera no empty cartridge to receive the exposed film, the film which is exposed in the camera and which is not situated in any cartridge or covered in any way is rendered useless by the entry of light when the rear wall of the camera is displaced to its open position.

Summary of the invention

It is therefore a primary object of the present invention to provide for a camera of this latter type a construction which will greatly simplify the manipulations which must be carried out by the operator.

In particular, it is an object of the present invention to provide a construction which will greatly simplify the operations which must be carried out by the operator in connection with the introduction into the camera of a cartridge of unexposed film and removal from the camera of a cartridge of exposed film.

Thus, it is an object of the present invention to provide a construction which is not only exceedingly simple to operate but which will eliminate the possibility of any errors in the handling of the cartridges.

Also, it is an object of the present invention to provide a construction of this type which will prevent in an automatic manner undesired exposure of film to light before the film is rewound into a cartridge.

In addition, it is an object of the present invention to provide a construction wherein the operations are almost fully automatic, except for the introduction and removal of a cartridge of film, so that there is practically no possibility of any errors on the part of the operator.

Furthermore, it is an object of the present invention of provide a construction of this type which is exceedingly simple and inexpensive while at the same time operating very reliably to achieve the desired results.

In accordance with the invention the camera has a housing means which is formed with a cartridge chamber to receive a cartridge of unexposed film. Spaced from this cartridge chamber is a film-receiving chamber to receive exposed film which is only coiled in this receiving chamber without being inserted into any cartridge or wound onto a spool. The film is advanced from the cartridge chamber to the film-receiving chamber by a film-moving means in the form of, for example, a rotary sprocket which coacts with perforations of the film to advance the latter. A single rotary manually operable means is provided for advancing the film during exposure thereof from the cartridge into the film-receiving chamber as well as for rewinding film in the reverse direction back into the cartridge in the cartridge chamber. The drive from the single rotary manually operable means is brought about by a transmission means which coacts with the manually operable rotary means and with the film-moving means, this transmission means having an advance position in which the transmission means, in response to rotation of the manually operable means in a given direction, actuates the film-moving means to advance the film from the cartridge to the film-receiving chamber of the camera housing means. The transmission means also has a rewinding position in which, in response to rotary movement of the manually operable means in the same given direction, the transmission means acts to drive the film-moving means in a direction which will rewind the film from the film-receiving chamber back into the cartridge in the cartridge chamber. A cam means is provided for displacing the transmission means between its advance and rewinding positions, and this cam means is also supported by the camera housing means for rotary movement and will during turning through a first angular increment maintain the transmission means in its film-advancing position and during turning through a second angular increment subsequent to the first angular increment will maintain the tranmission means in its rewiding position. The cam means is itself turned by the manually operable rotary means which at all times turns only in the above-mentioned given direction, and a counter means is operatively connected with the cam means to count the number of exposures and to indicate when film rewinding operations are taking place.

The camera housing means has a closure means in the form of a swingable camera rear wall which is displaceable between a closed position closing the housing means and an open position giving access to the interior thereof. A releasable lock means coacts with the closure means to releasably lock the latter in its closed position, and a second cam means coacts with the releasable lock means and is also turned by the single manually operable means, when the latter turns in the above-mentioned given direction, so that during the first increment of turning of the above first-mentioned cam means it is possible for the operator to manipulate the releasable lock means so as to open or close the camera, while during the second increment of turning when the film is being rewound, the second cam means coacts with the releasable lock means to maintain the latter in its locked position and thus to prevent the lock means from being placed in its release position during rewinding of the film. Furthermore, this second cam means operates to automatically place the lock means in its release position after the second increment of turning of the above first-mentioned cam means has been completed, so that upon completion of the rewinding operations the camera can be readily opened to remove the cartridge with the exposed film therein. This second cam means preferably forms a single unitary structure with the above first-mentioned cam means, and this unitary structure rotates about a common axis and is driven by the single manually operable means which always rotates in the same direction. Furthermore, a means coacts with the counter means to render the latter visible so that the operator can see when the frames are being exposed and can determine which frame is being exposed, and so that the operator can also see when the rewinding operations are taking place and when they have been completed.

With this structure of the invention, the manipulations in connection with the introduction of the unexposed film and the removal of the exposed film are simplified in that the camera is provided with only one chamber to receive the cartridge of unexposed film, and thus erroneous introduction of a cartridge cannot take place. Since the exposed film is not fed into an empty cartridge, handling of such an additional cartridge and the possibility of confusion between a pair of cartridges are excluded. Furthermore, with the camera of the invention the required rewinding of the exposed film back into the cartridge from which it was initially fed is carried out automatically in dependence upon the cam structure which carries the film counter, so that the rewinding operations are considerably simplified inasmuch as there is not requirement of a special manually adjustable structure to bring about the rewinding operations and the rewinding is carried out by the very same operation of the one manually operable means which is used during exposure of the film when it is advanced out of the cartridge.

As a result of the operative connection between the film-moving structure and the lock means for the rear wall of the camera, prevention of opening of the camera for completion of the rewinding operations is reliably maintained and thus the exposed film which is still situated outside of the cartridge cannot be spoiled by inadvertent opening of the camera. In addition, the automatic placing of the releasable lock means in its release position at the end of the rewinding operations, not only provides an indication that the rewinding operations have ended but the addition provides a further simplification of the manipulations required in connection with the camera of the invention.

Still other objects and advantages of the invention will in part be obvious and will in part be apparent from the specification.

The invention accordingly comprises the features of construction, combinations of elements, and arrangement of parts which will be exemplified in the constructions hereinafter set forth, and the scope of the invention will be indicated in the claims.

Brief description of the drawings

For a fuller understanding of the invention, reference is had to the following description taken in connection with the accompanying drawings, in which:

FIG. 5 is a fragmentary longitudinal sectional elevation showing the components of FIGS. 2-4 at a larger scale and taken along line V—V of FIG. 4 in the direction of the arrows;

FIG. 6 is a fragmentary sectional plan view taken along line VI—VI of FIG. 5 in the direction of the arrows and showing the releasable lock structure and the parts which control the same;

FIG. 7 is a fragmentary transverse elevation of the structure of FIG. 6 taken along line VII—VII of FIG. 6 in the direction of the arrows;

Description of preferred embodiments

Figure 1:
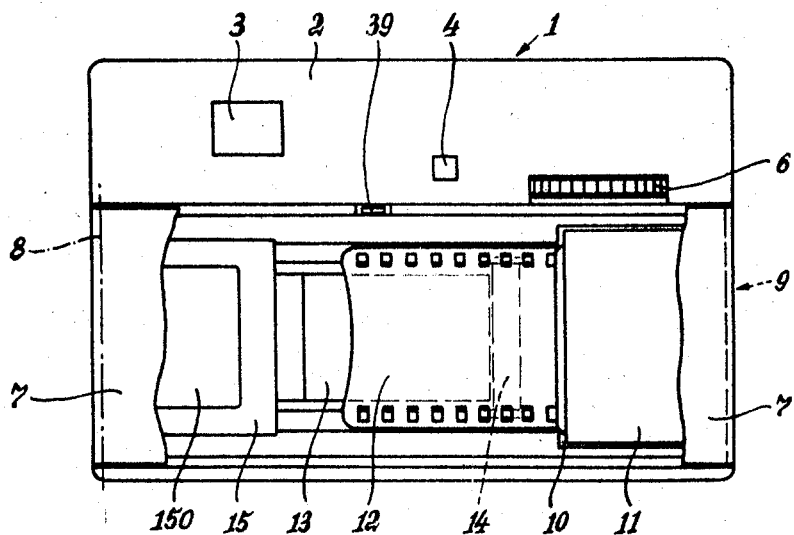
FIG. 1 is a schematic rear elevation of a camera according to the invention shown in FIG. 1 with part of the rear wall broken away.
Figure 2:
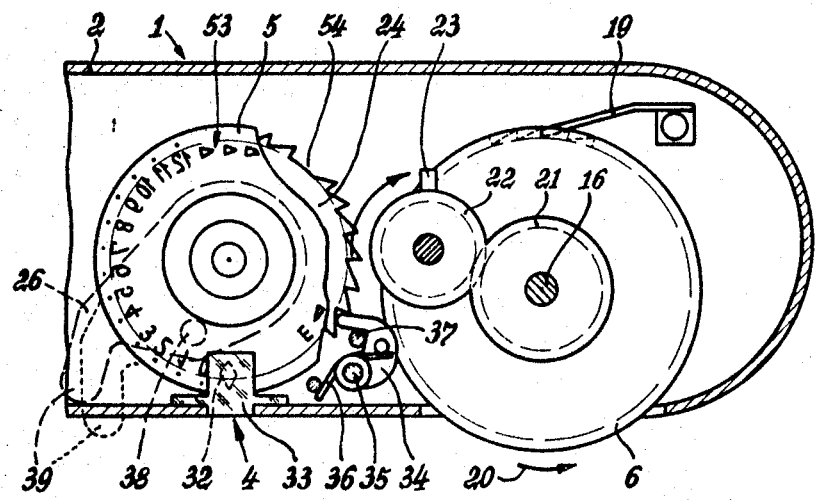
FIG. 2 is a fragmentary sectional plan view of the camera of FIG. 1, taken along line II—II of FIG. 5 in the direction of the arrows.

The camera 1 which is illustrated in FIGS. 1-7 has, as shown in FIG. 1, an upper hollow enclosure 2 provided at its rear wall with a viewfinder window 3, through which the operator looks into the viewfinder, and with a window 4 provided for the purpose of enabling the operator to see a film counter means 5 in the form of a circular disc bearing suitable film counter indicia thereon, as indicated in FIG. 2. At its lower right portion, as viewed in FIG. 1, the rear wall of the enclosure 2 is formed with a cutout at its bottom edge through which a manually operable rotary means 6 extends so as to be accessible to the hand of the operator, this manually operable rotary means 6 serving to enable the operator to move the film in the camera.

The hollow enclosure 2 is carried by a camera housing means which is provided with a closure means in the form of a rear wall 7 which is swingable about the axis indicated by the dot-dash line 8 at the left of FIG. 1, this swingable mounting of the closure means 7 being brought about through any suitable known hinge structure which hingedly connects the rear wall or closure means 7 to the camera housing means. This closure means 7 is thus swingable between a closed position closing off the interior of the camera housing means from the exterior thereof in a light-tight manner and an open position giving access to the interior of the camera housing means. A releasable lock means 9 situated at the right of the camera, as viewed in FIG. 1, serves to releasably lock the closure means 7 in its closed position, and the details of the releasable lock means 9 are described below in connection with FIGS. 6 and 7.

The rear wall or closure means 7 is shown broken away in FIG. 1 so as to illustrate in front of the rear wall 7 a cartridge chamber 10 of the camera housing means, this chamber 10 being adapted to receive the spool-less film cartridge 11 from which the leading end portion of a perforated film strip 12 extends. Between the cartridge chamber 10 and a film gate or exposed window 13, where the film is exposed when the shutter is released, is a film-moving means 14 (FIG. 5) in the form of a rotary sprocket member having sprocket teeth which coact with the film perforations, and this film-moving means 14 is driven when the operator actuates the manually operable means 6. The film 12 is fed in a stepwise manner out of the cartridge 11 and past the gate 13 into a film-receiving chamber 15 of the camera housing means into which the film is pushed and in which the film is coiled so as to be wound without being supported on any spool. This film-receiving chamber 15 of the camera housing means is provided in a known way with a leaf spring 150 (FIG. 1) which by its curved configuration compels the film which is fed into the film-receiving chamber 15 to take the form of a roll into which the film is coiled. The leaf spring 150 and the chamber 15 have a size which prevents insertion of a cartridge 11 into the chamber 15. The exposed film 12, after a predetermined number of frames have been exposed thereon, is then rewound by reverse turning of the film-moving means 14 back into the cartridge 11 into which the film is pushed during rewinding thereof, and after the rewinding operations are completed the film which is situated in the cartridge 11 in the form of a coil without any spool can be removed from the camera together with the cartridge 11.

The structure described below requires only exceedingly simple manipulations in connection with this type of film movement.

Referring to FIGS. 2 and 5, it will be seen that the manually operable means 6 is in the form of a rotary disc supported for turning movement by a stationary pin 16 which is fixedly mounted between a pair of intermediate substantially horizontal walls 17 and 18 of the camera housing means. At its exterior periphery the rotary disc 6 is provided with a sawtooth-type of knurling which coacts with a leaf spring 19 which is fixed to the intermediate wall 17. The free end of the leaf spring 19 coacts with these teeth at the periphery of the disc 6 so that this disc 6 is limited to only one direction of rotation. Thus, the leaf spring 19 together with the teeth of the periphery of the wheel or manually operable means 6 form a means limiting this manually operable means 6 to only one direction of rotation, namely the counterclockwise direction indicated by the arrow 20 in FIG. 2.

The manually operable means 6 has a gear 21 integrally united coaxially therewith, and this gear 21 meshes with a gear 22 supported for rotary movement on a pin carried by the intermediate wall 17. This gear 22 is provided with a feeding tooth 23 which projects beyond the periphery of the gear 22, as shown in FIGS. 2 and 5. At each complete revolution of the gear 22, the feeding tooth 23 engages the teeth at the periphery of a counter wheel 24 which forms part of a cam means. This counter wheel 24 fixedly carries at its upper surface the counter disc 5 which counts the number of images exposed, and at each revolution of the gear 22 the projection or tooth 23 advances the wheel 24 and the counter disc 5 through an increment corresponding to a film frame. Thus, the disc 5 forms a counter means for counting the number of frames exposed.

The wheel 24 is supported for turning movement on a pin or shaft 25 which is fixedly carried by a swingable carrier 26. This pin 25 has at its upper end portion a non-circular part 27, which may have a square configuration, and this part 27 extends through a matching opening formed in a stop-arm 28 which at its outer end terminates in a downwardly directed stop member 29 situated in an annular recess 30 of circular configuration formed at the interior of the wheel 24. The wheel 24 is provided in its recess 30 with a projection which coacts with the stop 29, this stop 29 being situated in the path of movement of the projection in the circular recess 30. A coil spring 31 which surrounds the inner cylindrical portion of the wheel 24 shown in FIG. 5 surrounding the shaft 25 has one end fixed to the wheel 24 and an opposite end fixed to the stop arm 28, and this spring 31 seeks to maintain the projection of wheel 24 in the recess 30 thereof in engagement with the stop 29. The resulting is that when this projection engages the stop 29 the starting position of the counter disc 5 is provided, and this starting position is indicated by a mark 32 which is visible at the window 4, a suitable reflecting structure 33 (FIG. 2) being provided for reflecting to the window 4 an image of the indicia carried by the upper surface of the counter disc 5.

A pawl 34 also coacts with the teeth at the periphery of wheel 24, these teeth providing the wheel 24 at its periphery with the construction of a ratchet wheel which coacts with the pawl 34 as well as with the feeding tooth 23. The pawl 34 is swingable supported on a pin 35 which is stationary and carried by the wall 17, for example, and a spring 36 coacts with the pawl 34 to urge it into engagement with a stationary pin 37 or the like which also may be carried by the wall 17. Thus, the pawl 34 together with the ratchet teeth at the periphery of the wheel 24 prevent a reverse turning of the wheel 24 by the spring 31 when the wheel 24 is advanced by the feeding tooth 23 at each rotation of the gear 22 in opposition to the spring 31. The carrier lever 26 which carries the pin 25 on which the wheel 24 is mounted is itself supported for turning movement by a bearing 38, so that the carrier lever 36 will swing about an axis parallel to but displaced from the axis of the shaft 25. An unillustrated spring acts upon the lever 26 to urge it to turn in a counterclockwise direction, as viewed in FIG. 2, about its bearing 38, so as to maintain the end portion 39 of the carrier 26 in engagement with the inner surface of the closed camera rear wall 7, so that the parts will have the position indicated in FIG. 2. When the rear wall or closure means 7 is displaced to its open position, the arm 26 will be moved by the unillustrated spring to the dotted line position indicated in FIG. 2, and the result is that the wheel 24 will turn about the bearing 38 so that the ratchet teeth at the periphery of the wheel 24 are displaced beyond the range of action of the pawl 34. Now the wheel 24 is released to the force of the spring 31 which turns the wheel 24 until the projection thereof in the recess 30 engages the stop 29 at the end of the arm 28, and in this way the wheel 24 is returned to its predetermined starting position.

The manually operable rotary means 6 is also integrally formed with a gear 40 which is coaxial with the rotary means 6 and which forms the input gear of a transmission means of the invention which serves to transmit the turning of the manually operable means 6 to the film-moving means 14. This film-moving means 14 is seated upon a non-circular portion 41 of a rotary shaft 42, this portion 41 having a square cross section, for example. An additional non-circular portion 43, which may also have a square cross section, of the shaft 42 is received in a matching bore portion of an elongated tubular hub of an output gear 44 of the transmission means, so that the bore portion of the hub of the gear 44 which receives the part 43 is also of a square cross section, for example. In this way the gear 44 and the sprocket roller 14 are compelled to rotate together. The shaft 42 extends upwardly beyond its non-circular portion 43 and has a cylindrical upper end portion which supports, for free rotary movement with respect to the shaft 42, a sleeve 45 which is fixed to a swing plate 46 of the transmission means. Thus, the upper end of the shaft 42 forms a bearing for the swing plate 46 which is connected with one end of a tension spring 47 (FIGS. 3 and 4) which maintains a follower projection 48 of the plate 46 constantly in engagement with the exterior surface of a cam means formed by the exterior surface of the hub of the wheel 24. As is apparent from FIGS. 3 and 4, this cam means includes a pair of arcuate cam portions 49 and 50 of different radii, respectively.

Figure 3:
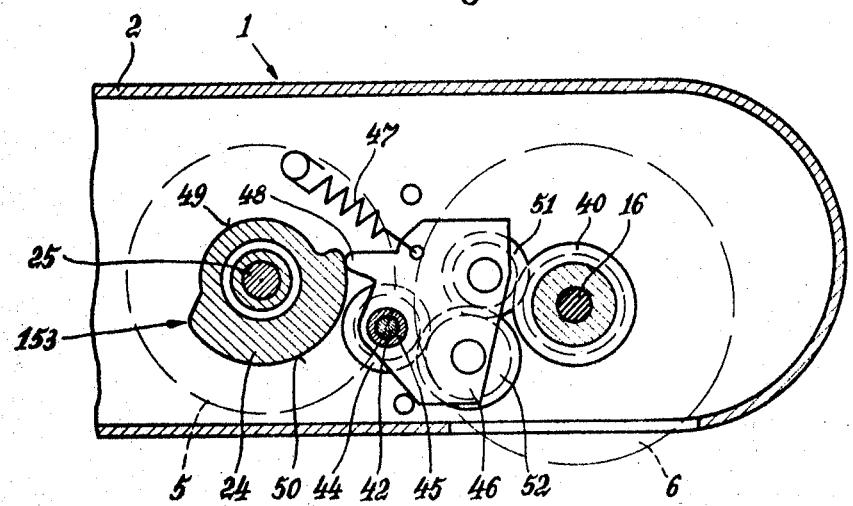
FIG. 3 is a sectional plan view of the camera of FIG. 1 taken along line III—III of FIG. 5 in the direction of the arrows and showing a transmission means of the invention in its film-advancing position.
Figure 4:
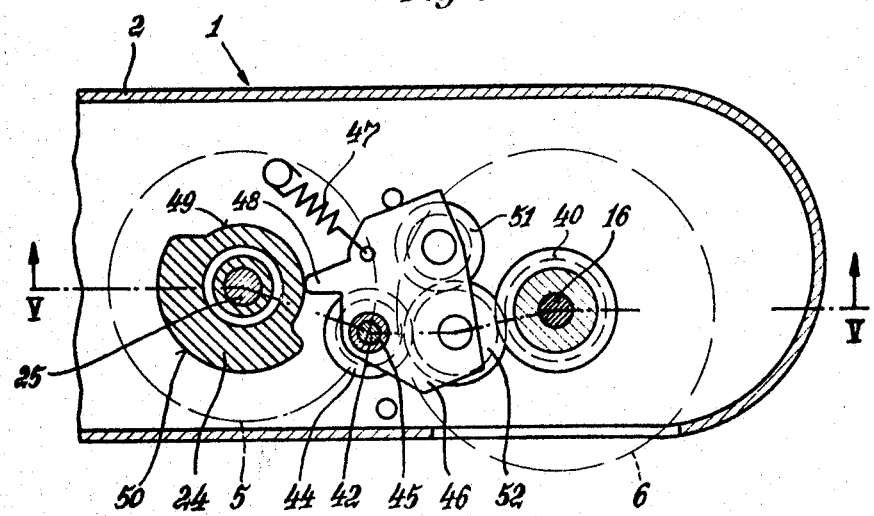
FIG. 4 shows the position which the parts of FIG. 3 take when the transmission means is in its film-rewinding position.

When the follower 48 engages the cam portion 50 of larger radius, the swing plate 46 is in the position shown in FIG. 3. This swing plate supports for rotary movement a reversing gear 51 of the transmission means, and this reversing gear 51 is constantly in mesh with an intermediate gear 52 of the transmission means which is also supported for rotary movement on a pin carried by the swing plate 46 and which is constantly in mesh with the gear 44 about whose axis the intermediate gear 52 turns together with the swing plate 46. When the swing plate 46 is maintained by the cam portion 50 in the position of FIG. 3, the reversing gear 51 meshes with the gear 40 which is fixed to the manually operable means 6 for rotation therewith, while the intermediate gear 52 is out of mesh with the gear 40. However, since this intermediate gear 52 is constantly in mesh with the gear 44, the drive is transmitted by this transmission means from its input gear 40 to its output gear 44 so as to drive the film-moving means 14 in a direction in which the film-moving means 14 acts to pull the film 12 out of the cartridge 11, so that the transmission means is shown in FIG. 3 in its advancing position. At the same time, the wheel 24 is advanced in a stepwise manner through the above-described structure at each revolution of the manually operable means 6 and the gear 22, with the result that the junction 153 (FIG. 3) between the cam portions 49 and 50 of this cam means approaches the follower 48. The parts are so designed that at each increment of turning of the wheel 24, which is to say at each revolution of the tooth 23, the film is advanced by a distance equal to a film frame and the counter means 5 is correspondingly advanced. In a known manner which is not, therefore, further illustrated the wheel 6 is prevented from being turned at each actuation thereof beyond the extent required to advance a single film frame into position to be exposed, and only upon tripping of the shutter in order to make the exposure in this structure actuated to release the wheel 6 for turning movement through the next actuation which will displace the next unexposed frame into position for exposure.

When the part of the film strip 12 is to receive the exposures has been completely exposed, as by receiving twelve exposures, for example, the graduation 12 of the counter means 5 will be visible at the window 4 and the junction 153 shown in FIG. 3 will be situated at the follower 48. During the next following actuation of the manually operable rotary means 6 and turning of the wheel 24 and cam means 49, 50 therewith, the follower 48 is displaced from the cam portion 50 of large radius to the cam portion 49 of small radius. As a result the swing plate 46 turns from the position of FIG. 3 into the rewinding position of FIG. 4 where the reversing gear 51 no longer meshes with the input gear 40 and instead the intermediate gear 52 meshes therewith. There is now a direct drive from the manually operable rotary means 6 from the gear 40 through the intermediate gear 52 to the output gear 44 which is connected to the film-moving means 14 for rotation therewith. As a result of this displacement of the transmission means to the rewinding position shown in FIG. 4, the direction of rotation of the film-moving means 14 is reversed while the manually operable means 6 is still turned by the operator in the same direction, so that now the exposed film 12 is returned into the cassette 11. The turning of the swing-plate 46 into the rewinding position shown in FIG. 4 also serves in an unillustrated manner to render inoperative the structure which blocks the rotation of the wheel 6 after it has been turned through the angle required to advance an unexposed frame into a position for exposure, so that now the wheel 6 can be continuously turned during the rewinding operations until the exposed film is again situated back in the cassette 11. At this time the operator will see at the window 4 the indicia 53 (FIG. 2) of the counter means 5, this indicia symbolizing that rewinding operations are going forward, and the indicia 53 ends in a symbol E which indicates the end of the rewinding operations. Thus, when the operator sees the letter E in the window 4, the operator knows that the rewinding operations have been completed.

The ratchet teeth at the periphery of the wheel 24 have a gap 54 which becomes situated in the path of turning of the tooth 23 when the letter E becomes visible at the window 4, so that even if the manually operable means 6 is still turned by the operator, the wheel 24 and thus the cam means 49, 50 will not be turned further. The further rotary movement of the transmission means will have no effect on the film because the film has now become situated beyond the film-moving means 14 between the latter and the cassette 11 so that the continued turning of the film-moving means 14 will have no influence on that portion of the film strip 12 which still projects from the cartridge or cassette 11 but does not reach the film-moving means 14.

The structure includes a second cam means which controls the releasable lock means 9, and this second cam means 55 (FIGS. 5 and 6) is also formed integrally with the wheel 24 and is situated at the hub thereof. The cam means 55 has the cam portions 56, 57, and 58 which are respectively of different radii, as shown in FIG. 6. This cam means 55 serves to control the position of a lever 59 which is supported for turning movement on an eccentric pin 60 or the like which is carried by the intermediate wall 18. A spring 61 coacts with the lever 59 so as to maintain a follower projection 62 thereof in engagement with the cam means 55. The other end of the lever 59 is formed with an opening 63 (see also FIG. 7) through which an end 64 of a lock slide 65 of the releasable lock means 9 extends. This lock means of course is provided for releasably holding the closure means 7 in its closed position, and for this purpose the lock slide 65 has a locking projection 66 which coacts with a locking projection 67 carried by and forming part of the closure means 7. A compression spring 68 seeks to displace the slide 65 upwardly to provide the locking coaction between the projections 66 and 67 illustrated in FIG. 7, and the extent of movement of the slide 65 is determined by a pin-and-slot guiding structure 69 which coacts therewith. This structure 69 includes the upper slot shown in FIG. 7 passing through the slide 65 and receiving a stationary pin. In addition, the slide 65 fixedly carries a manually engageable adjusting button 70 which projects to the exterior of the camera through a slot formed in the wall thereof and shown in dotted lines in FIG. 7 behind the slide 65, so that this latter structure also limits the upward movement of the slide 65 by the spring 68. The operator can, of course, at certain times determined by the cam means 55, displace the slide 65 downwardly in opposition to the spring 68, by manipulation of the button 70, so as to displace the projection 66 downwardly away from the projection 67 and thus release the closure means 7 for movement to its open position.

When the parts have the position shown in FIGS. 6 and 7 it is indeed possible for the operator to displace the button 70 downwardly so as to release the closure means, because the upper end portion 64 of the slide 65 is freely movable within the opening 63 of the lever 59. At this time the lever 59 has an angular position determined by engagement of the follower 62 with the cam portion 57 of the second cam means 55, this cam portion 57 having a radius of intermediate diameter. This cam portion 57 engages the follower 62 when the wheel 24 is in its starting position shown in FIG. 2 and during that angular increment of turning of the first cam means 49, 50 during which the cam portion 50 engages the follower 48, so that the transmission means is in the advancing position thereof shown in FIG. 3. Thus, until the last film frame is exposed it is possible for the operator to open the camera if desired.

However, when during the continued turning of the manually operable means 6 the exposed film is rewound in the above-described manner so that the indicia 53 is visible at the window 4, the cam portion 56 engages the follower 62, and this coaction between the cam means 55 and the lever 59 coincides with the second angular increment of turning of the cam means 49, 50 during which its cam portion 49 engages the follower 48. Thus, at this time the cam portion 56 of larger radius will act on the lever 59 so as to turn the latter in a clockwise direction, as viewed in FIG. 6, from the position shown in FIG. 6 to a position where the wall portion 71 of the lever 59 becomes situated beneath the projection 72 at the top end of the slide 65 (FIG. 7) and thus, for the duration of the rewinding operations the cam means 55 will reliably maintain the lock means 9 in its locking position and will exclude the possibility of displacement of the lock means to its release position, so that the closure means 7 cannot be displaced inadvertently to its open position during rewinding of the exposed film. In this way spoiling of the exposed film by exposing it to light is reliably avoided during the rewinding operations.

When the rewinding operations have been completed so that the letter E of the indicia 53 is visible at the window 4, the cam portion 58 of the cam means 55 engages the follower 62. As a result of the movement of the follower 62 from the cam portion 56 into engagement with the cam portion 58, the spring 61 swings the lever 59 in a counterclockwise direction, as viewed in FIG. 6, through an angle sufficiently great to cause the edge 73 at the opening 63 of the lever 59 to coact with the inclined edge 74 at the top end of the slide 65 so as to automatically displace the latter downwardly in opposition to the spring 68, thus placing the lock means 9 automatically in its release position. Therefore, at the end of the rewinding operations, the closure means 7 is automatically opened. The end 39 of the carrier lever 26 follows the opening movement of the closure means 7 in the above-described manner, so that the rotary wheel 24 is displaced beyond the range of action of the pawl 34 and the counter wheel is now returned to its starting position by the spring 31.

Figure 8:
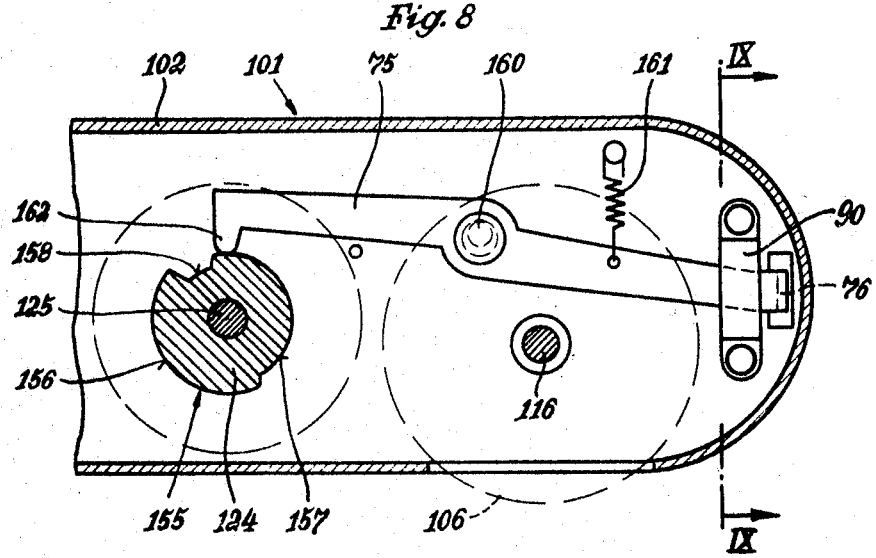
FIG. 8 is a fragmentary sectional plan view showing another embodiment of the structure which is illustrated in FIG. 6.
Figure 9:
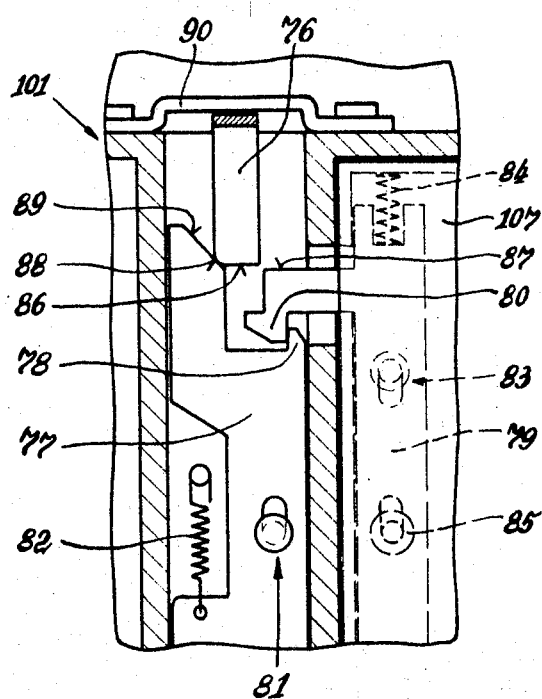
FIG. 9 is a transverse fragmentary sectional elevation taken along line IX—IX of FIG. 8 in the direction of the arrows.

FIGS. 8 and 9 show, in views which correspond to those of FIGS. 6 and 7, respectively, another embodiment of a lock means which may be used with the structure of the invention and which coacts in the above-described manner with the remaining film-controlling structure which is unchanged.

Referring now to FIGS. 8 and 9, there is located between the hollow enclosure 102 carried by the housing means of the camera 101 a manually operable rotary means 106 supported for turning movement by a pin 116 and illustrated in dotted lines in FIG. 8. In the manner which has been described above this manually operable rotary means coacts with a rotary counter wheel 124 which corresponds to the wheel 24 and which has a hub formed at its exterior surface with the cam means 155 which corresponds to the cam 55 and which has the cam portions 156, 157 and 158 of different radii, respectively. The cam means 155 is engaged by a follower 162 of a lever 75 which is acted upon by a spring 161 which serves to maintain the follower 162 in engagement with the cam means 155. The lever 75 is supported for turning movement on an eccentric pin 160 or the like. At its end distant from the follower 162, the lever 75 has a downwardly extending lug 76 (FIG. 9) situated in the region of the releasable lock means provided for releasably locking the closure means 107 in its closed position.

This construction differs from that of FIG. 7 in that it includes not only a lock slide 77 carried by the camera housing means and formed with a locking projection 78 but also a second lock slide 79 carried by the swingable rear closure wall 107 and having a locking projection 80 which coacts with the projection 78. The slide 77 is guided for vertical movement by a pin-and-slot guide means 81, and a relatively weak tension spring 82 seeks to maintain the slide 77 in its upper position determined by the pin-and-slot guiding structure 81, as shown in FIG. 9. This slide 77 does not have any manually engageable button or the like and is not capable of being manually operated.

The other lock slide 79 is guided by a pin-and-slot guiding structure 83, and a compression spring 84 holds it in the lower position shown in FIG. 9. This slide 79 can be manually displaced by engagement of an adjusting knob or button 85 which extends to the exterior of the door 107 on a pin extending through a slot formed in the door 107, so that the pin which carries the button 85 engages the bottom end of the slot formed in the door so as to also determine the lower end position of the lock slide 79. By raising the button 85 in opposition to the spring 84 it is possible for the operator to displace the lock projection 80 upwardly beyond the lock projection 78 so as to release the closure means 107 for movement to its open position.

Such an adjustment of the lock slide 79 is indeed possible when the parts have the position shown in FIGS. 8 and 9, since at this time the lever 75 engages with its follower 162 the cam portion 157 which is of intermediate radius and which has an angular increment equal to and angularly aligned with the cam portion 50 of the first-mentioned cam means 49, 50. Thus, when the wheel 124 is in its starting position corresponding to the starting position of the wheel 24 of FIG. 2, and during the stepwise advance of the film so as to expose the successive frames thereof, the parts will have the position shown in FIGS. 8 and 9 where the operator can open the camera, and these conditions will prevail until the last frame has been exposed.

At the beginning of the rewinding of the film, as already described above, the lever 75 has its follower tip 162 in engagement with the cam portion 156 of larger radius, with the result that the lever 75 is swung in a clockwise direction, as viewed in FIG. 8 in opposition to the spring 161 to a location where the lug 76 will have its bottom edge 86 situated directly over the upper edge 87 of the projection 80 of the slide 79. As a result it is not possible for the operator to raise the button 85 and the slide 79 therewith, because the strap 90 which extends over the lever 75 in the region of its lug 76 prevents upward movement of the lever 75 and thus the lock means is reliably maintained at this time in its locking position so that the closure means 107 cannot be displaced to its open position during the rewinding operations.

At the end of the rewinding operations, the cam portion 158 of smaller radius comes into engagement with the follower 162 of the lever 75, and upon movement of the follower 162 from the cam portion 156 into engagement with the cam portion 158 the lever 75 is swung by the spring 161 in a counterclockwise direction, as viewed in FIG. 8, thus causing the lug 76 to move to the left, as viewed in FIG. 9, so that its rounded lower left corner 88 shown in FIG. 9 engages the inclined edge 89 of the slide 77 to displace the latter downwardly in opposition to the weak spring 82, so that the lock projection 78 of the slide 77 now becomes automatically displaced below the lock projection 80 of the slide 79, thus releasing the closure means 107 which automatically opens at this time.

Thus, it will be seen that with the structure of the invention at the end of the rewinding operations the parts automatically assume a position where an immediate removal of the exposed film in the cartridge 11 from the interior of the camera housing can take place and an introduction of a new cartridge with unexposed film therein can also take place without requiring any adjustments of the driving structure or the like. The rewinding operations also are immediately followed without any special actuations on the part of the operator by a setting of the parts in a fully automatic manner in a position required for advancing of the unexposed film to expose the latter, and these latter operations take place by continuing to operate the manually operable means 6 in only one direction, the rewinding operations themselves taking place by continued operation of the manually operable means 6 in the same way it was perviously operated in connection with advancing of the film.

It will thus be seen that the objects set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a camera, housing means having only one cartridge chamber for receiving a cartridge of unexposed film, said housing also having a film-receiving chamber spaced from said cartridge chamber to receive exposed film and from which exposed film is rewound back into a cartridge in said cartridge chamber, film-moving means carried by said housing means between said chambers for engaging and moving film first from said cartridge chamber to said film-receiving chamber and for then returning film from said film-receiving chamber back to a cartridge in said cartridge chamber, manually operable rotary means carried by said housing means to be turned by the operator in a given direction, transmission means carried by said housing means and coacting with said manually operable rotary means and said film-moving means for transmitting movement from said manually operable rotary means to said film-moving means, said transmission means having an advancing position in which it actuates said film-moving means, in response to movement of said rotary means in said given direction, for advancing film from said cartridge chamber to said film-receiving chamber, and said transmission means having a rewinding position for moving film back from said film-receiving chamber to a cartridge in said cartridge chamber also in response to movement of said rotary means in said given direction, and rotary cam means coacting with said transmission means for situating the latter in said advancing position thereof during turning of said cam means from a given starting position through a first angular increment and for situating said transmission means in said rewinding position thereof during turning of said cam means through a second angular increment subsequent to said first angular increment, said manually operable rotary means coacting with said cam means for turning the latter sequentially through said first and second angular increments.

2. The combination of claim 1 and wherein a counter means is operatively connected with said cam means to turn therewith for counting the number of frames exposed during said first angular increment of turning of said cam means and for indicating that rewinding of the film takes place during said second angular increment of turning of said cam means.

3. The combination of claim 1 and wherein said housing means carries a closure means for movement between an open position giving access to the interior of said housing means so that a cartridge may be inserted into and removed from said cartridge chamber and a closed position closing said housing means to maintain film therein in a light-tight manner, releasable lock means carried by said housing means and said closure means and coacting with said housing means and closure means for releasably locking said closure means in said closed position thereof, said lock means having a release position releasing said closure means for movement from said closed to said open position thereof and a locking position preventing movement of said closure means from said closed to said open position thereof, and second rotary cam means carried by said housing means and coacting with said releasable lock means for automatically maintaining the latter in said locking position thereof during turning of said first-mentioned cam means through said second angular increment while exposed film is rewound and for automatically placing said lock means in said release position thereof after said first-mentioned cam means has turned through said second angular increment, so that said closure means can then be displaced from said closed to said open position thereof to permit a cartridge with exposed film rewound therein to be removed from said housing means, said second cam means also coacting with said manually operable rotary means to be turned thereby.

4. The combination of claim 3 and wherein both of said cam means have a common turning axis and form a single unit driven in response to rotation of said manually operable rotary means.

5. The combination of claim 1 and wherein said film-moving means includes a rotary sprocket having teeth coacting with film perforations to move the film, said transmission means including a gear train from said manually operable rotary means to said sprocket, and said gear train including a reversing gear and an input gear, said input gear being fixed to said manually operable rotary means for turning movement therewith, said transmission means having a swing plate turnable about a given axis and carrying said reversing gear for movement into and out of mesh with said input gear so that when said reversing gear is out of mesh with said input gear said transmission means is in said rewinding position while when said reversing gear is in mesh with said input gear said transmission means is in said advancing position, said cam means coacting with said swing plate for turning the latter to hold said reversing gear in mesh with said input gear during said first increment of turning of said cam means and to place said reversing gear out of mesh with said input gear during said second increment of turning of said cam means, and means coacting with said manually operable rotary means for limiting the latter only to said given direction of rotation.

6. The combination of claim 5 and wherein said swing plate is turnable about the axis of said sprocket, said gear train of said transmission means including an output gear fixed coaxially to said sprocket and an intermediate gear in permanent mesh with said output gear and carried by said swing plate for movement into mesh with said input gear when said reversing gear is out of mesh therewith and out of mesh with said input gear when said reversing gear is in mesh therewith.

7. The combination of claim 6 and wherein said swing plate has a cam follower projection directly engaging said cam means, and spring means acting on said swing plate for maintaining said cam follower projection thereof in engagement with said cam means.

8. The combination of claim 7 and wherein said first and second angular increments together provide for said cam means almost a single complete revolution, said cam means having a first arcuate portion of one radius coacting with said cam follower projection of said swing plate during turning of said cam means through said first angular increment and a second arcuate portion of a second radius coacting with said cam follower projection during said second angular increment of turning of said cam means.

9. The combination of claim 8 and wherein a film counter means is operatively connected with said cam means to turn therewith and to indicate the number of frames exposed during said first increment and to indicate that rewinding operations are taking place during said second angular increment of turning of said cam means, and means coacting with said counter means for rendering the latter visible at the exterior of said housing means.

10. The combination of claim 1 and wherein a spring means coacts with said cam means for urging the latter to said starting position thereof, said manually operable rotary means turning said cam means in opposition to said spring means, and pawl-and-ratchet means coacting with said cam means for preventing return thereof to said starting position by said spring means, a lever turnably carried by said housing means and carrying said cam means, and closure means carried by said housing means for closing and opening the latter and having a closed position coacting with said lever for maintaining said cam means at a location where said pawl-and-ratchet means prevents return of said cam means to said starting position thereof by said spring means, said closure means when displaced to an open position opening said housing means releasing said lever for turning movement to a location rendering said pawl-and-ratchet means inoperative to prevent return of said cam means to said starting position thereof by said spring means, so that when said closure means is displaced to its open position said cam means will automatically be returned by said spring means to said starting position thereof.

11. The combination of claim 10 and wherein said pawl-and-ratchet means includes a ratchet wheel coaxially fixed to said cam means for rotation therewith and a pawl having a stationary axis and coacting with said ratchet wheel only when said closure means is in said closed position thereof, said manually operable rotary means having a tooth which coacts with said ratchet wheel to turn the latter upon rotary movement of said manually operable rotary means, and said ratchet wheel having a peripheral toothed portion formed with a gap through which said tooth of said manually operable rotary means turns when said cam means has turned through said second increment, so that at the end of the rewinding of the film further turning of said manually operable rotary means will not result in further turning of said cam means.

12. The combination of claim 3 and wherein said second cam means has a predetermined axis and has distributed about said axis three arcuate portions of different radii, respectively, the first of which coacts with said lock means during turning of said first-mentioned cam means through said first increment to render said lock means manually displaceable between said locking and release positions thereof, the second of which coacts with said lock means during said second angular increment of turning of said first-mentioned cam means for holding said lock means in said locking position, and the third of which coacts with said lock means to automatically place the latter in said release position after said first-mentioned cam means has turned through said second increment.

13. The combination of claim 12 and wherein said lock means includes a lock slide shiftably carried by said housing means for manual shifting movement and having a locking projection, and a coacting locking projection carried by said closure means to coact with said locking projection of said slide for maintaining said closure means in said closed position, a cam follower lever turnably carried by said housing means and coacting with said second cam means, and a blocking projection carried by said slide and overlapping a portion of said lever during said second increment of turning of said first-mentioned cam means, said slide having an inclined camming edge engaged by a portion of said lever to be displaced thereby to a position displacing said locking projection of said slide away from said coacting projection of said closure means when said third arcuate portion of said second cam means engages said follower lever.

14. The combination of claim 12 and wherein said releasable lock means includes a pair of shiftable lock slides respectively carried by said housing means and closure means and respectively having coacting locking projections which engage each other to hold said closure means in said closed position thereof, and a cam follower lever coacting with said second cam means and overlapping a portion of said slide carried by said closure means to prevent movement of the latter slide when said first-mentioned cam means turns through said second angular increment, said lever coacting with said slide carried by said housing means to maintain the latter slide in the position permitting manual displacement of said slide carried by said closure means to a position placing said lock means in said release position thereof during turning of said first-mentioned cam means through said first increment, and said second cam means coacting at said third camming portion thereof with said lever to displace said slide carried by said housing means to a location automatically placing said lock means in said release position thereof.

15. The combination of claim 3 and wherein a cam follower lever is turnably carried by said housing means and coacts with said second cam means to control said releasable lock means from said second cam means for holding said lock means in said locking position thereof during turning of said first-mentioned cam means through said second increment thereof, to automatically place said lock means in said release position thereof at the end of the turning of said first-mentioned cam means through said second increment, and to render said lock means manually operable during turning of said first-mentioned cam means through said first increment.

References Cited
UNITED STATES PATENTS

| | | | |
|---|---|---|---|
| 2,906,184 | 9/1959 | Hennig et al. | 95—31 |
| 3,096,699 | 7/1963 | Harvey et al. | 95—31 |
| 3,137,457 | 6/1964 | Beach | 95—31 |

NORTON ANSHER, Primary Examiner

DAVID S. STALLARD, Assistant Examiner